United States Patent
Yu et al.

(10) Patent No.: US 11,039,448 B2
(45) Date of Patent: Jun. 15, 2021

(54) RESOURCE SCHEDULING METHOD AND APPARATUS

(71) Applicant: Huawei Technologies Co., Ltd., Shenzhen (CN)

(72) Inventors: Haifeng Yu, Beijing (CN); Xin Xiong, Beijing (CN); Feng Yu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/579,288

(22) Filed: Sep. 23, 2019

(65) Prior Publication Data

US 2020/0022150 A1 Jan. 16, 2020

Related U.S. Application Data (63) Continuation of application No. PCT/CN2018/079940, filed on Mar. 22, 2018.

(30) Foreign Application Priority Data

Mar. 24, 2017 (CN) .......................... 201710181606.3

(51) Int. Cl.
*H04W 72/04* (2009.01)
*H04W 76/27* (2018.01)
(Continued)

(52) U.S. Cl.
CPC ....... *H04W 72/0493* (2013.01); *H04L 5/0082* (2013.01); *H04L 5/0094* (2013.01);
(Continued)

(58) Field of Classification Search
None
See application file for complete search history.

(56) References Cited

U.S. PATENT DOCUMENTS

| 2008/0214220 A1 | 9/2008 | Beziot et al. |
| 2010/0091726 A1 | 4/2010 | Ishii et al. |

(Continued)

FOREIGN PATENT DOCUMENTS

| CN | 1917706 A | 2/2007 |
| CN | 103220068 A | 7/2013 |

(Continued)

OTHER PUBLICATIONS

"UL HARQ Re-transmissions across different numerologies," 3GPP TSG-RAN WG1#88, Athens, Greece, R1-1703048, pp. 1-2, 3rd Generation Partnership Project, Valbonne, France (Feb. 13-17, 2017).

(Continued)

*Primary Examiner* — Anh Vu H Ly
(74) *Attorney, Agent, or Firm* — Leydig, Voit & Maver, Ltd, (57) ABSTRACT

A resource scheduling method includes: obtaining, by a terminal device, a first resource configuration parameter from an access network device; determining, by the terminal device, whether a first logical channel (LCH) supports the first resource configuration parameter, where the first LCH is an LCH on which there is to-be-sent data; and if the first LCH supports the first resource configuration parameter, determining, by the terminal device, a resource of the first LCH based on the first resource configuration parameter. According to a resource scheduling method provided in this application, after obtaining the first resource configuration parameter, the terminal device determines the resource of the first LCH by determining whether a mapping relationship exists between the first LCH and the first resource configuration parameter, to map the first LCH to the resource that matches the first LCH. This improves resource utilization.

20 Claims, 5 Drawing Sheets (51) Int. Cl.
  *H04L 5/00* (2006.01)
  *H04L 27/26* (2006.01)
  *H04W 72/12* (2009.01)
  *H04W 72/14* (2009.01)
  *H04W 80/02* (2009.01)

(52) U.S. Cl.
  CPC ..... *H04L 27/2607* (2013.01); *H04W 72/1284* (2013.01); *H04W 72/14* (2013.01); *H04W 76/27* (2018.02); *H04W 80/02* (2013.01)

(56) References Cited

U.S. PATENT DOCUMENTS

| | | | |
|---|---|---|---|
| 2012/0057547 A1* | 3/2012 | Lohr | H04L 5/0064 370/329 |
| 2014/0133410 A1* | 5/2014 | Nguyen | H04W 72/1242 370/329 |
| 2015/0215953 A1 | 7/2015 | Wang et al. | |
| 2016/0366682 A1 | 12/2016 | Tseng et al. | |
| 2018/0077718 A1* | 3/2018 | Nory | H04L 1/1854 |
| 2018/0077719 A1* | 3/2018 | Nory | H04W 28/0278 |
| 2018/0270699 A1* | 9/2018 | Babaei | H04W 72/0453 |
| 2018/0270700 A1* | 9/2018 | Babaei | H04L 47/826 |
| 2018/0270839 A1* | 9/2018 | Loehr | H04W 72/0446 |
| 2018/0279229 A1* | 9/2018 | Dinan | H04W 52/146 |
| 2018/0279358 A1* | 9/2018 | Babaei | H04W 72/0453 |
| 2019/0075588 A1* | 3/2019 | Dudda | H04W 4/70 |
| 2019/0246414 A1* | 8/2019 | Yang | H04L 5/0091 |
| 2019/0335451 A1* | 10/2019 | Yang | H04W 72/14 |
| 2019/0342902 A1* | 11/2019 | Wu | H04L 5/0082 |
| 2020/0267753 A1* | 8/2020 | Adjakple | H04W 72/1226 |
| 2020/0367246 A1* | 11/2020 | Loehr | H04W 72/1242 |

FOREIGN PATENT DOCUMENTS

| | | |
|---|---|---|
| CN | 103634914 A | 3/2014 |
| CN | 106255210 A | 12/2016 |
| CN | 105165033 B | 4/2019 |
| EP | 2894917 A1 | 7/2015 |

OTHER PUBLICATIONS

"Impacts on the UL grant and LCP of different numerologies and flexible TTI," 3GPP TSG-RAN WG2 #96, Reno, Nevada, USA, R2-168659, XP051178215, pp. 1-4, 3rd Generation Partnership Project, Valbonne, France (Nov. 14-18, 2016).

"3rd Generation Partnership Project; Technical Specification Group Radio Access Network; Study on Scenarios and Requirements for Next Generation Access Technologies; (Release 14)," 3GPP TR 38.913 V14.1.0, pp. 1-38, 3rd Generation Partnership Project, Valbonne, France (Dec. 2016).

"Layer 2 functions for multiple numerologies," 3GPP TSG-RAN WG2 NR #97 Meeting, Athens, Greece, R2-1701470, KP051212104, pp. 1-3, 3rd Generation Partnership Project, Valbonne, France (Feb. 13-17, 2017).

* cited by examiner

An access network device determines a first resource configuration parameter — S610

The access network device sends an uplink grant to a terminal device, where the uplink grant is used by the terminal device to determine a resource of an LCH corresponding to the first resource configuration parameter, and the uplink grant includes the first resource configuration parameter, or the uplink grant includes indication information of the first resource configuration parameter, or the uplink grant is further used to authorize the terminal device to use a first resource that has a mapping relationship with the first resource configuration parameter to send uplink data, or a second resource used by the access network device to send the uplink grant has a mapping relationship with the first resource configuration parameter — S620

RESOURCE SCHEDULING METHOD AND APPARATUS

CROSS-REFERENCE TO RELATED APPLICATIONS

This application is a continuation of International Application No. PCT/CN2018/079940, filed on Mar. 22, 2018, which claims priority to Chinese Patent Application No. 201710181606.3, filed on Mar. 24, 2017. The disclosures of the aforementioned applications are hereby incorporated by reference in their entireties.

TECHNICAL FIELD

This application relates to the communications field, and in particular, to a resource scheduling method and apparatus in the wireless communications field.

BACKGROUND

In a 5th generation (5G) mobile communications technology, communications scenarios are classified into three types: enhanced mobile broadband (eMBB), massive machine-type communications (mMTC), and ultra-reliable and low-latency communication (URLLC).

There are various types of services in a 5G communications system. Different types of services have significantly different requirements on an air interface design. If a resource configuration is performed on the services in the 5G communications system based on an existing resource configuration method, a resource cannot meet a service requirement, resulting in resource waste. Therefore, how to meet resource requirements for different types of services is an urgent problem that needs to be resolved.

SUMMARY

This application provides a resource scheduling method, to meet resource requirements for different types of services and improve resource utilization.

According to an aspect, a resource scheduling method is provided. The method includes: obtaining, by a terminal device, a first resource configuration parameter from an access network device; determining, by the terminal device, whether a first logical channel (LCH) supports the first resource configuration parameter, where the first LCH is an LCH on which there is to-be-sent data; and if the first LCH supports the first resource configuration parameter, determining, by the terminal device, a resource of the first LCH based on the first resource configuration parameter.

According to a resource scheduling method provided in this application, after obtaining the first resource configuration parameter, the terminal device determines the resource of the first LCH by determining whether a mapping relationship exists between the first LCH and the first resource configuration parameter, to map the first LCH to the resource that matches the first LCH. This improves resource utilization.

Optionally, the obtaining, by a terminal device, a first resource configuration parameter from an access network device includes: receiving, by the terminal device, an uplink grant sent by the access network device, where the uplink grant includes the first resource configuration parameter, or the uplink grant includes indication information of the first resource configuration parameter; and determining, by the terminal device, the first resource configuration parameter based on the uplink grant.

In this way, the access network device can flexibly indicate a resource configuration parameter allocated to the terminal device.

Optionally, the obtaining, by a terminal device, a first resource configuration parameter from an access network device includes: receiving, by the terminal device, an uplink grant sent by the access network device, where the uplink grant is used to authorize the terminal device to use a first resource to send uplink data; and determining, by the terminal device, the first resource configuration parameter based on the first resource and a mapping relationship between the first resource and the first resource configuration parameter.

According to a resource scheduling method provided in this application, the access network device can flexibly indicate a resource configuration parameter allocated to the terminal device. In addition, an existing information format does not need to be modified, and good compatibility is provided.

Optionally, the obtaining, by a terminal device, a first resource configuration parameter from an access network device includes: receiving, by the terminal device, an uplink grant sent by the access network device by using a second resource; and determining, by the terminal device, the first resource configuration parameter based on the second resource and a mapping relationship between the second resource and the first resource configuration parameter.

According to a resource scheduling method provided in this application, the access network device can flexibly indicate a resource configuration parameter allocated to the terminal device. In addition, an existing information format does not need to be modified, and good compatibility is provided.

Optionally, the uplink grant includes a second resource configuration parameter or indication information of a second resource configuration parameter, and the second resource configuration parameter is a resource configuration parameter other than the first resource configuration parameter.

According to a resource scheduling method provided in this application, the access network device can flexibly indicate a resource configuration parameter allocated to the terminal device.

Optionally, the method further includes: receiving, by the terminal device, the uplink grant sent by the access network device, where the uplink grant is used to authorize the terminal device to use a third resource to send the uplink data; and determining, by the terminal device, a second resource configuration parameter based on the third resource and a mapping relationship between the third resource and the second resource configuration parameter, where the second resource configuration parameter is a resource configuration parameter other than the first resource configuration parameter.

According to a resource scheduling method provided in this application, the access network device can flexibly indicate a resource configuration parameter allocated to the terminal device.

Optionally, the determining, by the terminal device, whether a first logical channel (LCH) supports the first resource configuration parameter includes: receiving, by the terminal device, a control message sent by the access network device, where the control message includes a first correspondence, and the first correspondence is a correspondence between at least one LCH and at least one resource configuration parameter; and determining, by the terminal device based on the first correspondence, whether the first LCH supports the first resource configuration parameter.

In this way, the terminal device and the access network device can flexibly determine a correspondence between the first LCH and the first resource configuration parameter.

Optionally, the control message is a radio resource control (RRC) connection reconfiguration message, a physical downlink control channel (PDCCH), a media access control control element (MAC CE), or the uplink grant.

The access network device dynamically adjusts the first correspondence by using the PDCCH or the MAC CE, so that an LCH requirement matches a resource scheduled by the access network device in real time, and fairness for allocating resources to all LCHs can also be ensured.

Optionally, when the terminal device determines that not all uplink resources corresponding to the first resource configuration parameter are allocated after allocation of the resource of the first LCH based on the first resource configuration parameter, the method further includes: determining, by the terminal device, a second LCH from a plurality of LCHs based on priorities of the plurality of LCHs, where the second LCH is an LCH that is other than the first LCH and on which there is to-be-sent data, and a priority of the second LCH is lower than a priority of the first LCH; and determining, by the terminal device, a resource of the second LCH based on the first resource configuration parameter.

According to a resource scheduling method provided in this application, it is ensured that a resource can be allocated to data on a high-priority LCH in time.

Optionally, the method further includes: determining, by the terminal device, a resource configuration of a third LCH based on the second resource configuration parameter, where the third LCH is an LCH that is other than the first LCH and on which there is to-be-sent data, and a priority of the second resource configuration parameter is lower than a priority of the first resource configuration parameter.

According to a resource scheduling method provided in this application, it can be ensured that a resource is allocated to a high-priority service in time.

Optionally, the first resource configuration parameter is a lowest-priority resource configuration parameter or a highest-priority resource configuration parameter that the first LCH can support.

According to a resource scheduling method provided in this application, the first LCH can match a more appropriate resource configuration parameter.

According to another aspect, a resource scheduling method is provided. The method includes: determining, by an access network device, a first resource configuration parameter; sending, by the access network device, an uplink grant to a terminal device, where the uplink grant is used by the terminal device to determine a resource of a logical channel (LCH) corresponding to the first resource configuration parameter, and the uplink grant includes the first resource configuration parameter, or the uplink grant includes indication information of the first resource configuration parameter, or the uplink grant is further used to authorize the terminal device to use a first resource that has a mapping relationship with the first resource configuration parameter to send uplink data, or a second resource used by the access network device to send the uplink grant has a mapping relationship with the first resource configuration parameter.

According to a resource scheduling method provided in this application, the access network device indicates, to the terminal device, the first resource configuration parameter used to determine the resource of the LCH, so that the LCH can match the first resource configuration parameter. This improves resource utilization. Moreover, the access network device can further flexibly indicate a resource configuration parameter allocated to the terminal device. In addition, an existing information format does not need to be modified, and good compatibility is provided.

Optionally, the uplink grant includes a second resource configuration parameter or indication information of a second resource configuration parameter, and the second resource configuration parameter is a resource configuration parameter other than the first resource configuration parameter.

In this way, the access network device can flexibly indicate a resource configuration parameter allocated to the terminal device.

Optionally, the uplink grant is further used to authorize the terminal device to use the second resource that has a mapping relationship with a second resource configuration parameter to send the uplink data, and the second resource configuration parameter is a resource configuration parameter other than the first resource configuration parameter.

According to a resource scheduling method provided in this application, the access network device can flexibly indicate a resource configuration parameter allocated to the terminal device. In addition, an existing information format does not need to be modified, and good compatibility is provided.

Optionally, the method further includes: sending, by the access network device, a control message to the terminal device, where the control message includes a first correspondence, the first correspondence is a correspondence between at least one LCH and at least one resource configuration parameter, and the first correspondence is used by the terminal device to determine the LCH corresponding to the first resource configuration parameter.

In this way, the access network device and the terminal device can flexibly determine a correspondence between the LCH and a resource configuration parameter.

Optionally, the control message is a radio resource control (RRC) connection reconfiguration message, a physical downlink control channel (PDCCH), a media access control control element (MAC CE), or the uplink grant.

The access network device dynamically adjusts the first correspondence by using the PDCCH or the MAC CE, so that an LCH requirement matches a resource scheduled by the access network device in real time, and fairness for allocating resources to all LCHs can also be ensured.

Optionally, the control message further includes first priority information, the first priority information is used to indicate priorities of a plurality of LCHs, and the first priority information is used by the terminal device to preferentially determine a resource of a high-priority LCH in the plurality of LCHs.

According to a resource scheduling method provided in this application, it is ensured that a resource can be allocated to the high-priority LCH in time.

Optionally, the control message further includes second priority information, the second priority information is used to indicate priorities of a plurality of resource configuration parameters, and the second priority information is used by the terminal device to preferentially determine a resource of an LCH corresponding to a high-priority resource configuration parameter in the plurality of resource configuration parameters.

According to a resource scheduling method provided in this application, it can be ensured that a resource is allocated to a high-priority service in time.

Optionally, the first resource configuration parameter is a lowest-priority resource configuration parameter or a highest-priority resource configuration parameter that the LCH corresponding to the first resource configuration parameter can support.

According to a resource scheduling method provided in this application, the LCH can match a more appropriate resource configuration parameter.

According to still another aspect, this application provides a resource scheduling apparatus. The apparatus can implement functions performed by the terminal device in the methods in the foregoing aspects. The functions may be implemented by hardware, or may be implemented by hardware executing corresponding software. The hardware or software includes one or more units or modules corresponding to the foregoing functions.

In a possible design, a structure of the apparatus includes a processor and a transceiver. The processor is configured to support the apparatus in performing a corresponding function in the foregoing method. The transceiver is configured to support communication between the apparatus and another network element. The apparatus may further include a memory. The memory is configured to be coupled to the processor, and the memory stores a program instruction and data that are necessary for the apparatus.

According to yet another aspect, this application provides a resource scheduling apparatus. The apparatus can implement functions performed by the access network device in the methods in the foregoing aspects. The functions may be implemented by hardware, or may be implemented by hardware executing corresponding software. The hardware or software includes one or more units or modules corresponding to the foregoing functions.

In a possible design, a structure of the apparatus includes a processor and a transceiver. The processor is configured to support the apparatus in performing a corresponding function in the foregoing method. The transceiver is configured to support communication between the apparatus and another network element. The apparatus may further include a memory. The memory is configured to be coupled to the processor, and the memory stores a program instruction and data that are necessary for the apparatus.

According to still yet another aspect, a network system is provided. The network system includes the resource scheduling apparatuses described in the foregoing aspects.

According to a further aspect, a computer program product is provided. The computer program product includes computer program code, and when the computer program code is run by a communications unit, a processing unit or a transceiver, and a processor of a terminal device, the terminal device is enabled to perform a method in the foregoing implementations.

According to a still further aspect, a computer program product is provided. The computer program product includes computer program code, and when the computer program code is run by a communications unit, a processing unit or a transceiver, and a processor of an access network device, the access network device is enabled to perform a method in the foregoing implementations.

According to a yet further aspect, this application provides a computer storage medium. The computer storage medium is configured to store a computer software instruction used by the foregoing terminal device. The computer software instruction includes a program designed for performing the foregoing aspects.

According to a still yet further aspect, this application provides a computer storage medium. The computer storage medium is configured to store a computer software instruction used by the foregoing access network device. The computer software instruction includes a program designed for performing the foregoing aspects.

DESCRIPTION OF EMBODIMENTS

The following describes technical solutions in this application with reference to the accompanying drawings.

Figure 1:
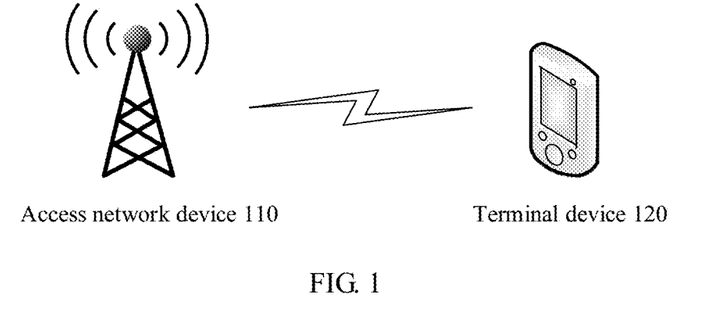
FIG. 1 is a schematic architectural diagram of a communications system applicable to this application.

FIG. 1 shows a communications system 100 applicable to this application. The communications system 100 includes an access network device 110 and a terminal device 120. The access network device 110 communicates with the terminal device 120 by using a wireless network. When the terminal device 120 sends data, a wireless communications module may encode information for transmission. Specifically, the wireless communications module may obtain a specific quantity of data bits that need to be sent to the access network device 110 through a channel. These data bits are, for example, data bits generated by a processing module, received from another device, or stored in a storage module. These data bits may be included in one or more transport blocks (which may also be referred to as information blocks or data blocks), and the transport block may be segmented to generate a plurality of code blocks.

In this application, the terminal device may be referred to as an access terminal, a user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a handheld device having a wireless communications function, a computing device, another processing device connected to a wireless modem, a vehicle-mounted device, a wearable device, or user equipment in a 5G communications system.

The access network device may be a base transceiver station (BTS) in a code division multiple access (CDMA)

system, may be a nodeB (NB) in a wideband code division multiple access (WCDMA) system, may be an evolved nodeB (eNB) in a long term evolution (LTE) system, or may be a gNB in a 5G communications system. The foregoing base stations are merely examples for description. The access network device may be alternatively a relay station, an access point, a vehicle-mounted device, a wearable device, or another type of device.

The communications system applicable to this application is merely an example for description, and the communications system applicable to this application is not limited thereto. For example, the communications system may include another quantity of network devices and another quantity of terminal devices.

For ease of understanding of this application, before a feedback information sending method provided in this application is described, concepts in this application are briefly described first.

There are various types of services in the 5G communications system, and different types of services have different requirements on an air interface. For example, an Internet of Vehicles service with a millisecond-level latency requires an ultra-short time domain symbol and an ultra-short transmission time interval (TTI) at an air interface. This requires a relatively large subcarrier spacing in frequency domain. In a multi-connection scenario of the Internet of Things, an amount of data transmitted by a single sensor is extremely small, but a requirement for an overall quantity of connections in the communications system is relatively high. This requires a relatively small subcarrier spacing configured in frequency domain. However, in time domain, both a time domain symbol and a TTI may be long enough, inter-symbol interference almost does not need to be considered, and a cyclic prefix (CP) does not need to be introduced. Moreover, an asynchronous operation may also reduce power consumption of the terminal device.

To meet requirements of different application scenarios, a new resource configuration parameter (e.g. numerology) is introduced into the 5G communications system, and one resource configuration parameter may include the following characteristics: a subcarrier spacing, a TTI, and a CP. Different resource configuration parameters correspond to different resources. The resource configuration parameter may further include a parameter of another granularity that can be supported in 5G. This is not specifically limited herein.

Different resource configuration parameters may apply to different services. For example: a resource configuration parameter 1 applies to a URLLC service, and a resource configuration parameter 2 applies to an eMBB service. For the URLLC service, only the resource configuration parameter 1 can be used. For the eMBB service, both the resource configuration parameter 2 and the resource configuration parameter 1 can be used.

In addition, one service may use a plurality of resource configuration parameters, and the plurality of resource configuration parameters may have different priorities based on degrees of matching with the service. For example, the eMBB service may use the resource configuration parameter 1 and the resource configuration parameter 2. Because the resource configuration parameter 2 is a resource configuration parameter specially designed for the eMBB service, a degree of matching between the resource configuration parameter 2 and the eMBB service is higher than a degree of matching between the resource configuration parameter 1 and the eMBB service. In other words, for the eMBB service, a priority of the resource configuration parameter 2 is higher than a priority of the resource configuration parameter 1.

One logical channel (LCH) may correspond to one or more resource configuration parameters. When one LCH corresponds to a plurality of resource configuration parameters, the terminal device needs to select one resource configuration parameter from the plurality of resource configuration parameters, and map the LCH to a resource corresponding to the resource configuration parameter. Different LCHs may have different logical channel priorities (LCPs). When the terminal device performs LCH mapping, LCPs of different LCHs need to be considered. The LCPs may be distinguished based on emergency degrees or quality of service requirements of to-be-sent data. For example, in a URLLC scenario, important burst data usually needs to be transmitted, and a priority of an LCH on which burst data needs to be transmitted is higher than a priority of an LCH corresponding to common data. Therefore, a resource needs to be preferentially allocated. In other words, the LCH on which burst data needs to be transmitted is preferentially mapped to a resource corresponding to a resource configuration parameter.

The following describes in detail a resource scheduling method according to this application.

Figure 2:
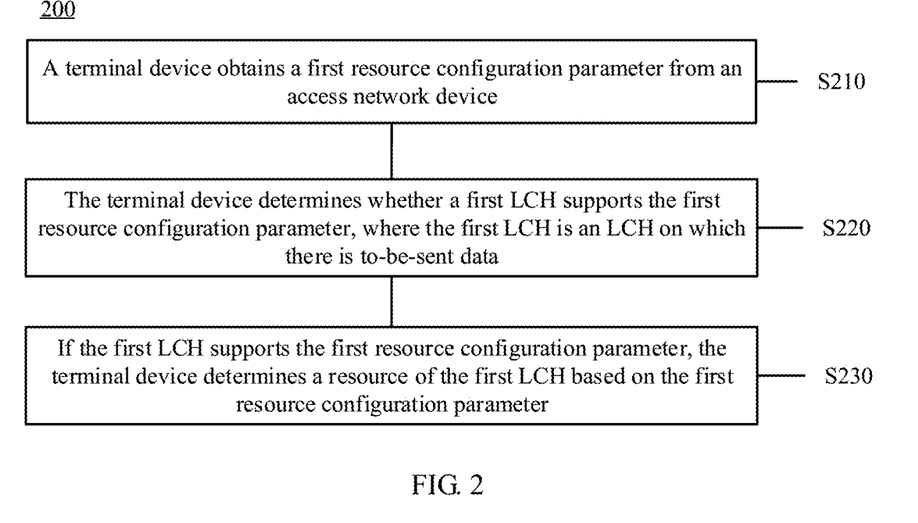
FIG. 2 is a schematic flowchart of a resource scheduling method according to this application.

FIG. 2 is a schematic flowchart of a resource scheduling method according to this application. The method 200 includes the following steps.

S210: A terminal device obtains a first resource configuration parameter from an access network device.

S220: The terminal device determines whether a first LCH supports the first resource configuration parameter, where the first LCH is an LCH on which there is to-be-sent data.

S230: If the first LCH supports the first resource configuration parameter, the terminal device determines a resource of the first LCH based on the first resource configuration parameter.

In the method 200, the terminal device may be, for example, a UE, and the access network device may be, for example, a base station. For ease of understanding of this application, the following uses the UE and the base station as an example for description.

When the UE needs to send data, the UE sends a request message to the base station, where the request message may carry a type of the to-be-sent data and/or a size of a required resource. After receiving the request message, the base station allocates a resource to the UE, and indicates, by using the first resource configuration parameter, the resource allocated to the UE.

In S210, the first resource configuration parameter is any resource configuration parameter obtained by the UE from the base station. A method for obtaining, by the UE, a resource configuration parameter allocated by the base station is not limited in this application.

After obtaining the first resource configuration parameter, the UE determines whether the first LCH supports the first resource configuration parameter, to be specific, whether a mapping relationship exists between the first LCH and the first resource configuration parameter. The first LCH is one or more LCHs on which there is to-be-sent data. When the first LCH supports the first resource configuration parameter, the UE determines the resource of the first LCH based on the first resource configuration parameter, and maps the first LCH to a resource corresponding to the first resource configuration parameter.

The UE may determine, based on a correspondence preset on the UE, whether the first LCH supports the first resource configuration parameter. The correspondence preset on the UE may be specified in a communications protocol, may be pre-configured by the base station for the UE, or may be delivered to the UE together with the first resource configuration parameter.

When the first LCH does not support the first resource configuration parameter, the UE may not perform resource mapping on the first LCH, or may map the first LCH to another remaining resource.

It should be understood that in this application, both "when" and "if" indicate that the terminal device or the access network device performs corresponding processing in a specific case, are not intended to limit time, and does not mean that there is another limitation either.

According to a resource scheduling method provided in this application, after obtaining the first resource configuration parameter, the terminal device determines the resource of the first LCH by determining whether the mapping relationship exists between the first LCH and the first resource configuration parameter, to map the first LCH to the resource that matches the first LCH. This improves resource utilization.

Optionally, that a terminal device obtains a first resource configuration parameter from an access network device includes the following steps.

S211: The terminal device receives an uplink grant sent by the access network device, where the uplink grant includes the first resource configuration parameter, or the uplink grant includes indication information of the first resource configuration parameter, or the uplink grant includes first resource indication information.

S212: The terminal device determines the first resource configuration parameter based on the uplink grant.

The base station may add a new information element to the uplink grant (UL grant). The information element may be the first resource configuration parameter, or may be the indication information of the first resource configuration parameter. When the uplink grant carries the indication information of the first resource configuration parameter, a correspondence between the indication information and the first resource configuration parameter may be specified in a communications protocol, or a correspondence between the indication information and the first resource configuration parameter may be pre-agreed on by the base station and the UE through information exchange. In this way, the base station can flexibly indicate a resource configuration parameter allocated to the terminal device.

Optionally, that a terminal device obtains a first resource configuration parameter from an access network device includes the following steps.

S213: The terminal device receives an uplink grant sent by the access network device, where the uplink grant is used to authorize the terminal device to use a first resource to send uplink data.

S214: The terminal device determines the first resource configuration parameter based on the first resource and a mapping relationship between the first resource and the first resource configuration parameter.

The base station may not add the first resource configuration parameter or indication information of the first resource configuration parameter into the uplink grant, but may indicate the first resource configuration parameter by using an existing uplink grant, and the UE reinterprets the uplink grant. For example, the base station instructs, based on the uplink grant, the UE to send the uplink data by using the first resource, where the first resource may be a physical uplink shared channel (PUSCH). After receiving the uplink grant, the UE determines to send the uplink data by using the first resource, and determines the first resource configuration parameter based on the mapping relationship, pre-stored on the UE, between the first resource and the first resource configuration parameter, where the mapping relationship may be specified in a communications protocol, or may be configured by a base station, for example, delivered together with the uplink grant to the UE.

The foregoing embodiment is merely an example for description, and this application is not limited thereto. For example, the first resource may be alternatively a physical uplink control channel (PUCCH), or the first resource may be alternatively a code domain resource or a space domain resource used by the UE to send the uplink data.

In this way, according to a resource scheduling method provided in this application, the access network device can flexibly indicate a resource configuration parameter allocated to the terminal device. In addition, an existing information format does not need to be modified, and good compatibility is provided.

Optionally, that a terminal device obtains a first resource configuration parameter from an access network device includes the following steps.

S215: The terminal device receives an uplink grant sent by the access network device by using a second resource.

S216: The terminal device determines the first resource configuration parameter based on the second resource and a mapping relationship between the second resource and the first resource configuration parameter.

The base station and the UE may also agree on the mapping relationship between the second resource and the first resource configuration parameter. The second resource is a resource used by the base station to send the uplink grant, for example, the second resource is a physical downlink control channel (PDCCH). After receiving the uplink grant, the UE determines the first resource configuration parameter based on a PDCCH occupied by the uplink grant and a mapping relationship between the PDCCH and the first resource configuration parameter, where the mapping relationship may be specified in a communications protocol, or may be configured by a base station, for example, delivered together with the uplink grant to the UE.

The second resource may be alternatively a control channel element (CCE), a search space, or a control resource set. One CCE includes a plurality of resource element groups (REGs), one PDCCH may be formed by aggregating one or more CCEs, a plurality of candidate PDCCHs constitute the search space, the control resource set is an REG corresponding to a given resource configuration parameter (numerology), and a one-to-one correspondence exists between the control resource set and the search space, or one control resource set corresponds to a plurality of search spaces.

The UE may obtain the uplink grant from the base station through blind detection, and may define that the mapping relationship between the second resource and the first resource configuration parameter is a mapping relationship between a first CCE and the first resource configuration parameter. When detecting the uplink grant on the first CCE, the UE may directly determine the first resource configuration parameter. A mapping relationship between a first search space and the first resource configuration parameter may be defined by the base station or may be defined in a communications protocol. A correspondence also exists between the first search space and the first CCE. When detecting the uplink grant on the first CCE, the UE may indirectly determine the first resource configuration parameter based on the correspondence between the first CCE and the first search space and a correspondence between the first search space and the first resource configuration parameter.

The foregoing embodiment is merely an example for description, and this application is not limited thereto. For example, the second resource may be alternatively a code domain resource or a space domain resource used by the base station to send the uplink grant.

In this way, according to a resource scheduling method provided in this application, the access network device can flexibly indicate a resource configuration parameter allocated to the terminal device. In addition, an existing information format does not need to be modified, and good compatibility is provided.

Optionally, the uplink grant includes a second resource configuration parameter or indication information of a second resource configuration parameter, and the second resource configuration parameter is a resource configuration parameter other than the first resource configuration parameter.

The base station may send a plurality of resource configuration parameters or indication information of a plurality of resource configuration parameters to the UE. The plurality of resource configuration parameters or the indication information of the plurality of resource configuration parameters may be located in a same uplink grant or may be located in different uplink grants.

Figure 3:
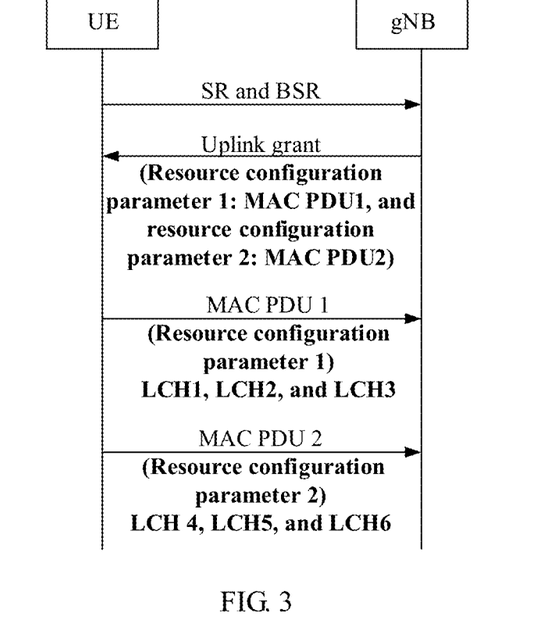
FIG. 3 is a schematic flowchart of allocating a plurality of resource configuration parameters by a base station to a user equipment according to this application.

FIG. 3 is a schematic flowchart of allocating a plurality of resource configuration parameters by a base station to a UE.

The UE sends a scheduling request (SR) and a buffer status report (BSR) to a gNB, and reports a resource configuration parameter requirement to the gNB.

After receiving the SR and the BSR, the gNB determines to allocate a resource configuration parameter 1 and a resource configuration parameter 2 to the UE, and indicates, to the UE, the two resource configuration parameters by using an uplink grant. The resource configuration parameter 1 corresponds to a medium access control protocol data unit (MAC PDU) 1, and the resource configuration parameter 2 corresponds to a MAC PDU 2. The foregoing embodiment is merely an example for description, and the resource configuration parameter 1 and the resource configuration parameter 2 may be alternatively mapped to a same LCH.

After receiving the uplink grant, the UE aggregates data on an LCH1, an LCH2, and an LCH3 to constitute a MAC PDU 1, and sends the MAC PDU 1 to the gNB; and aggregates data on an LCH4, an LCH5, and an LCH6 to constitute a MAC PDU 2, and sends the MAC PDU 2 to the gNB. The MAC PDU 1 and the MAC PDU 2 may be sent simultaneously or may be sent nonsimultaneously.

Figure 4:
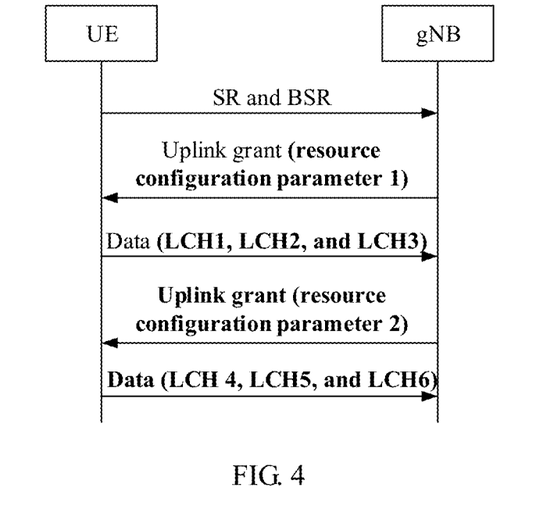
FIG. 4 is another schematic flowchart of allocating a plurality of resource configuration parameters by a base station to a user equipment according to this application.

FIG. 4 is another schematic flowchart of allocating a plurality of resource configuration parameters by a base station to a UE.

The UE sends a scheduling request (SR) and a buffer status report (BSR) to a gNB, and reports a resource configuration parameter requirement to the gNB.

After receiving the SR and the BSR, the gNB determines to allocate a resource configuration parameter 1 and a resource configuration parameter 2 to the UE, and indicates, to the UE, the two resource configuration parameters by using two uplink grants. The two uplink grants may be sent simultaneously, or may be sent nonsimultaneously. The resource configuration parameter 1 corresponds to a MAC PDU 1, and the resource configuration parameter 2 corresponds to a MAC PDU 2. The foregoing embodiment is merely an example for description, and the resource configuration parameter 1 and the resource configuration parameter 2 may be alternatively mapped to a same LCH set.

After receiving the uplink grants, the UE aggregates data on an LCH1, an LCH2, and an LCH3 to constitute a MAC PDU 1, and sends the MAC PDU 1 to the gNB; and aggregates data on an LCH4, an LCH5, and an LCH6 to constitute a MAC PDU 2, and sends the MAC PDU 2 to the gNB. The MAC PDU 1 and the MAC PDU 2 may be sent simultaneously or may be sent nonsimultaneously.

In this way, according to a resource scheduling method provided in this application, the access network device can flexibly indicate a resource configuration parameter allocated to the terminal device.

Optionally, the method 200 further includes the following steps.

S240: The terminal device receives the uplink grant sent by the access network device, where the uplink grant is used to authorize the terminal device to use a third resource to send the uplink data.

S250: The terminal device determines a second resource configuration parameter based on the third resource and a mapping relationship between the third resource and the second resource configuration parameter, where the second resource configuration parameter is a resource configuration parameter other than the first resource configuration parameter.

For example, the base station instructs, based on the uplink grant in S211 or S213, the UE to send the uplink data by using the third resource, where the third resource may be a time domain resource, a frequency domain resource, a code domain resource, or a space domain resource. After receiving the uplink grant, the UE determines to send the uplink data by using the third resource, and determines the first resource configuration parameter based on a mapping relationship between, pre-stored on the UE, the third resource and the first resource configuration parameter, where the mapping relationship may be specified in a communications protocol, or may be configured by the base station.

In this way, the access network device can flexibly indicate a resource configuration parameter allocated to the terminal device. In addition, an existing information format does not need to be modified, and good compatibility is provided.

Optionally, that the terminal device determines whether a first LCH supports the first resource configuration parameter includes the following steps.

S221: The terminal device receives a control message sent by the access network device, where the control message includes a first correspondence, and the first correspondence is a correspondence between at least one LCH and at least one resource configuration parameter.

S222: The terminal device determines, based on the first correspondence, whether the first LCH supports the first resource configuration parameter.

The first correspondence that is used by the UE to determine whether the first LCH supports the first resource configuration parameter may be configured by the base station. In other words, the base station indicates, to the UE, the first correspondence by using the control message. The base station may adjust a priority of the first LCH by using the control message, or may adjust, by using the control message, an LCH corresponding to the first resource configuration parameter.

In this way, the UE and the base station can flexibly determine a correspondence between the first LCH and the first resource configuration parameter.

Optionally, the control message is a radio resource control (RRC) connection reconfiguration message, a PDCCH, a MAC control element (CE), or the uplink grant.

The base station dynamically adjusts the first correspondence by using the PDCCH or the MAC CE, so that an LCH requirement matches a resource scheduled by the base station in real time, and fairness for allocating resources to all LCHs can also be ensured.

Optionally, when the terminal device determines that not all uplink resources corresponding to the first resource configuration parameter are allocated after allocation of the resource of the first LCH based on the first resource configuration parameter, the method 200 further includes the following steps.

S260: The terminal device determines a second LCH from a plurality of LCHs based on priorities of the plurality of LCHs, where the second LCH is an LCH that is other than the first LCH and on which there is to-be-sent data, and a priority of the second LCH is lower than a priority of the first LCH.

S270: The terminal device determines a resource of the second LCH based on the first resource configuration parameter.

In S260, the second LCH may be an LCH that supports the first resource configuration parameter, or may be an LCH that does not support the first resource configuration parameter.

Optionally, the method 200 further includes the following steps.

S280: The terminal device determines a resource configuration of a third LCH based on the second resource configuration parameter, where the third LCH is an LCH that is other than the first LCH and on which there is to-be-sent data, and a priority of the second resource configuration parameter is lower than a priority of the first resource configuration parameter.

A priority of a resource configuration parameter is related to a type of a service to which the resource configuration parameter is applicable. For example, a priority of a resource configuration parameter applicable to a URLLC service is higher than a priority of a resource configuration parameter applicable to an eMBB service. The UE first determines a resource of an LCH corresponding to a high-priority resource configuration parameter. This can ensure that a resource is allocated to a high-priority service in time.

The following describes an example in which the UE allocates resources for a plurality of LCHs. However, this application is not limited thereto.

The base station may allocate a resource to the UE by using the uplink grant. After receiving the uplink grant, the UE may allocate a resource to each LCH according to a token bucket mechanism. Data on LCHs to which resources are allocated may constitute a MAC PDU. Then, the UE sends the MAC PDU.

The token bucket mechanism is described as follows.

The base station configures a priority, a prioritized bit rate (PBR), and a token bucket size duration (BSD) for each LCH by using an RRC message. The PBR is used to indicate an amount of data that is allowed to be sent on an LCH with a different priority in each scheduling. An amount of data that can be sent on a low-priority LCH in one scheduling is less than an amount of data that can be sent on a high-priority LCH in one scheduling. The BSD is used by the UE to determine a token bucket size. The token bucket size is determined by PBR×BSD.

The UE maintains a parameter Bj for each LCH, where Bj is a quantity of currently available tokens in a token bucket, the quantity of tokens may be a negative number, and an initial value of Bj may be 0. Bj is increased by PBR×TTI every TTI, but a value of Bj cannot exceed a token bucket size of the LCH. If a value of Bj that is obtained through calculation exceeds the token bucket size, the value of Bj needs to be set to the token bucket size.

The UE allocates resources based on the following steps.

Step 1: After obtaining the first resource configuration parameter from the base station, the UE selects, from a plurality of LCHs, an LCH that supports the first resource configuration parameter.

Step 2: For LCHs whose Bjs are greater than 0, the UE sequentially allocates resources in descending order of priorities (that is, first allocates a resource to a high-priority LCH). If a PBR of an LCH is set to infinity, the UE allocates all current resources to the LCH and ignores a low-priority LCH.

Step 3: After successfully scheduling the LCH, the UE performs a subtraction operation on Bj of the LCH, that is, decreases a value of Bj.

Step 4: If there is still a remaining resource after a round of scheduling, all the LCHs are scheduled in descending order of priorities (the value of Bj is not considered) until all the LCHs are scheduled or there is no remaining current resource. Fair scheduling needs to be considered for LCHs with a same priority.

The UE may first obtain the first resource configuration parameter, and then sort, based on priorities, LCHs that support the first resource configuration parameter, and allocate resources to the LCHs. The UE may alternatively first sort all the LCHs based on the priorities, and after obtaining the first resource configuration parameter from the base station, the UE allocates resources to LCHs that support the first resource configuration parameter. In other words, sequences of step 1 and step 2 may be exchanged.

In step 4, for example, if the UE successfully schedules a first LCH, that is, allocates the resource corresponding to the first resource configuration parameter to the first LCH, and there is still a remaining resource corresponding to the first resource configuration parameter, the UE may allocate the resource corresponding to the first resource configuration parameter to a second LCH, where a priority of the second LCH is lower than a priority of the first LCH, and the second LCH may be an LCH that supports the first resource configuration parameter, or may be an LCH that does not support the first resource configuration parameter (in other words, LCHs corresponding to different resource configuration parameters may be multiplexed together). This improves resource utilization.

If the UE further obtains the second resource configuration parameter from the base station, and the priority of the second resource configuration parameter is lower than the priority of the first resource configuration parameter, the UE schedules an LCH corresponding to the second resource configuration parameter after scheduling all LCHs corresponding to the first resource configuration parameter. In this way, it can be ensured that a resource is allocated to a high-priority service in time.

Figure 5:
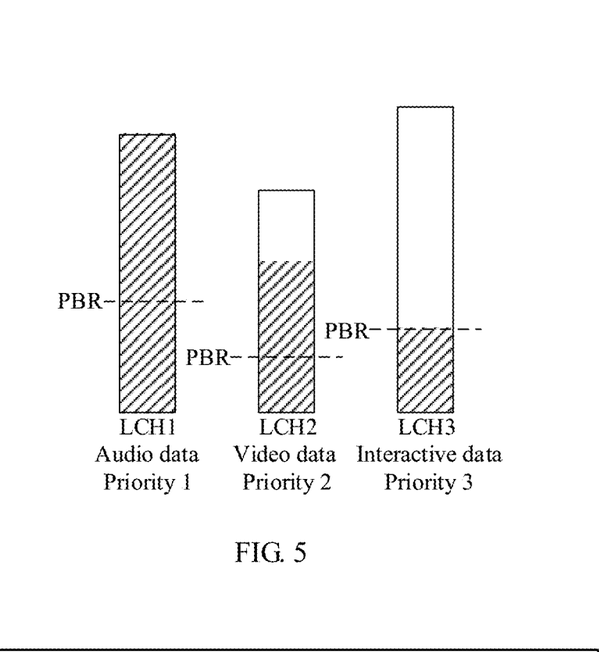
FIG. 5 is a schematic representation of different LCHs according to this application.

As shown in FIG. 5, each rectangle represents an LCH. Currently, there are three LCHs on which there is to-be-sent data (that is, Bjs of the three LCHs are greater than 0), namely, an LCH1, an LCH2, and an LCH3. To-be-sent data on the LCH1 is audio data, and a priority of the LCH1 is a priority 1. To-be-sent data on the LCH2 is video data, and a priority of the LCH2 is a priority 2. To-be-sent data on the LCH3 is interactive data, and a priority of the LCH3 is a priority 3.

The UE receives an RRC connection reconfiguration message sent by the base station, where the RRC connection reconfiguration message carries a correspondence between the three LCHs and three resource configuration parameters (namely, a resource configuration parameter 1, a resource configuration parameter 2, and a resource configuration parameter 3), and priorities of the three LCHs and sequences of using different resource configuration parameters may be configured by the base station.

For example, the priorities of the three LCHs are as follows: the priority 1>the priority 2>the priority 3.

A sequence of using the resource configuration parameters by each LCH is as follows:

LCH1 {the resource configuration parameter 1>the resource configuration parameter 2>the resource configuration parameter 3};

LCH2 {the resource configuration parameter 1>the resource configuration parameter 2}; and LCH3 {the resource configuration parameter 2>the resource configuration parameter 3}.

Sequences of all resource configuration parameters in a brace are priorities of resource configuration parameters corresponding to each LCH. The foregoing sequences are merely an example for description. For different LCHs, priorities of a plurality of same resource configuration parameters may be different.

If a resource configuration parameter carried in the uplink grant is the resource configuration parameter 2, all the three LCHs can use a resource corresponding to the resource configuration parameter 2. Because the priority of the LCH1 is highest, a resource is preferentially allocated to the LCH1, and then resources are allocated to the LCH2 and the LCH3.

If a resource configuration parameter carried in the uplink grant is the resource configuration parameter 3, the UE may not allocate a resource to the LCH2. If there is still a remaining resource corresponding to the LCH3 after the UE allocates resources to the LCH1 and the LCH3, the UE may also map the LCH2 to a resource corresponding to the resource configuration parameter 3.

A dark part of each rectangle in FIG. 5 represents an amount of to-be-sent data on a current LCH, and a dark part below a dashed line represents an amount of data that is on the LCH, that is determined based on a PBR, and to which a resource can be allocated in current scheduling. It will be appreciated that after the current scheduling, there is still remaining data (for example, a dark part above the dashed line) that is on the LCH1 and the LCH2 and to which no resource is allocated. If there are still remaining resources after the current round of scheduling, the remaining resources may be allocated to the remaining data on the LCH1 and the LCH2. Because the priority of the LCH1 is higher than the priority of the LCH2, a resource is first allocated to the remaining data on the LCH1, and after the resource is allocated to the remaining data on the LCH1, a resource is allocated to the remaining data on the LCH2. When the remaining resources are allocated to the remaining data on the LCH1 and the LCH2, values of Bjs of the LCH1 and the LCH2 are not considered. Even if the values of Bjs of the two LCHs are less than 0, resources are still allocated to the remaining data on the two LCHs.

In this way, according to a resource scheduling method provided in this application, it is ensured that a resource can be allocated to data on a high-priority LCH in time, and resource utilization is improved.

Optionally, the first resource configuration parameter is a lowest-priority resource configuration parameter or a highest-priority resource configuration parameter that the first LCH can support.

FIG. 5 is still used as an example. If a resource configuration parameter carried in the uplink grant is the resource configuration parameter 2, and the resource configuration parameter 2 is a lowest-priority resource configuration parameter that each LCH can support, the LCH1 and the LCH2 may be mapped to a resource corresponding to the resource configuration parameter 1, so that services can be better provided for the LCH1 and the LCH2. If the resource configuration parameter 2 is a highest-priority resource configuration parameter that each LCH can support, all the LCH1, the LCH2, and the LCH3 may be mapped to a resource corresponding to the resource configuration parameter 2.

The foregoing describes a resource scheduling method provided in this application from a perspective of a terminal device. The following describes, with reference to the accompanying drawings, a resource scheduling method provided in this application from a perspective of an access network device.

Figure 6:
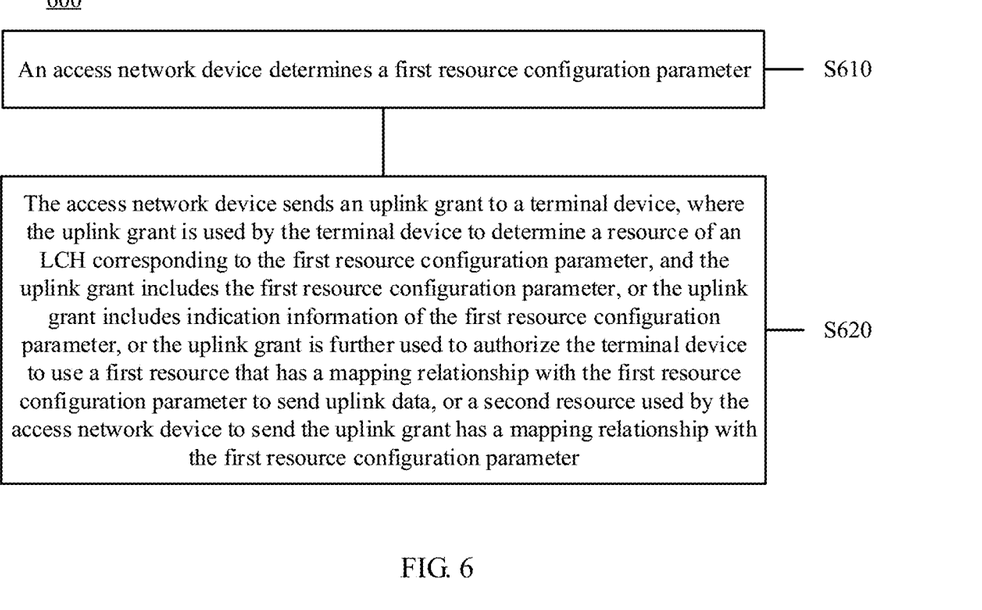
FIG. 6 is a schematic flowchart of another resource scheduling method according to this application.

FIG. 6 is a schematic flowchart of still another resource scheduling method according to this application. The method 600 includes the following steps.

S610: An access network device determines a first resource configuration parameter.

S620: The access network device sends an uplink grant to a terminal device, where the uplink grant is used by the terminal device to determine a resource of an LCH corresponding to the first resource configuration parameter, and the uplink grant includes the first resource configuration parameter, or the uplink grant includes indication information of the first resource configuration parameter, or the uplink grant is further used to authorize the terminal device to use a first resource that has a mapping relationship with the first resource configuration parameter to send uplink data, or a second resource used by the access network device to send the uplink grant has a mapping relationship with the first resource configuration parameter.

The access network device may determine, based on a request message reported by the terminal device, a type of data to be sent by the terminal device and/or a size of a resource required by the terminal device, and determine the first resource configuration parameter based on an actual situation.

A person skilled in the art may clearly understand that in the method 600, both the access network device and the terminal device may be equivalent to the access network device and the terminal device in the method 200, and actions of the access network device and the terminal device correspond to actions of the access network device and the terminal device in the method 200. For brevity, details are not repeated here.

In this way, according to a resource scheduling method provided in this application, the access network device indicates, to the terminal device, the first resource configuration parameter used to determine the resource of the LCH, so that the LCH can match the first resource configuration parameter. This improves resource utilization. Moreover, the access network device can further flexibly indicate a resource configuration parameter allocated to the terminal device. In addition, an existing information format does not need to be modified, and good compatibility is provided.

Optionally, the uplink grant includes a second resource configuration parameter or indication information of a second resource configuration parameter, and the second resource configuration parameter is a resource configuration parameter other than the first resource configuration parameter.

In this way, a base station can flexibly indicate a resource configuration parameter allocated to a UE.

Optionally, the uplink grant is further used to authorize the terminal device to use the second resource that has a mapping relationship with a second resource configuration parameter to send the uplink data, and the second resource configuration parameter is a resource configuration parameter other than the first resource configuration parameter.

According to a resource scheduling method provided in this application, the access network device can flexibly indicate a resource configuration parameter allocated to the terminal device. In addition, an existing information format does not need to be modified, and good compatibility is provided.

Optionally, the method 600 further includes the following steps.

S630: The access network device sends a control message to the terminal device, where the control message includes a first correspondence, the first correspondence is a correspondence between at least one LCH and at least one resource configuration parameter, and the first correspondence is used by the terminal device to determine the LCH corresponding to the first resource configuration parameter.

In this way, the UE and the base station can flexibly determine a correspondence between the LCH and a resource configuration parameter.

Optionally, the control message is a radio resource control (RRC) connection reconfiguration message, a PDCCH, a MAC CE, or the uplink grant.

The base station dynamically adjusts the first correspondence by using the PDCCH or the MAC CE, so that an LCH requirement matches a resource scheduled by the base station in real time, and fairness for allocating resources to all LCHs can also be ensured.

Optionally, the control message further includes first priority information, the first priority information is used to indicate priorities of a plurality of LCHs, and the first priority information is used by the terminal device to preferentially determine a resource of a high-priority LCH in the plurality of LCHs.

For an embodiment in which the terminal device preferentially determines, based on the first priority information indicated by the base station, the resource of the high-priority LCH in the plurality of LCHs, refer to the embodiment corresponding to FIG. 5. For brevity, details are not repeated here.

According to a resource scheduling method provided in this application, it is ensured that a resource can be allocated to a high-priority LCH in time.

Optionally, the control message further includes second priority information, the second priority information is used to indicate priorities of a plurality of resource configuration parameters, and the second priority information is used by the terminal device to preferentially determine a resource of an LCH corresponding to a high-priority resource configuration parameter in the plurality of resource configuration parameters.

For an embodiment in which the terminal device preferentially determines, based on the second priority information indicated by the base station, the resource of the high-priority LCH in the plurality of LCHs, refer to the embodiment corresponding to FIG. 5. For brevity, details are not repeated here. This can ensure that a resource is allocated to a high-priority service in time.

Optionally, the first resource configuration parameter is a lowest-priority resource configuration parameter or a highest-priority resource configuration parameter that the LCH corresponding to the first resource configuration parameter can support.

According to a resource scheduling method provided in this application, the LCH can match a more appropriate resource configuration parameter.

The foregoing describes in detail an example of a resource scheduling method according to this application. It may be understood that to implement the foregoing functions, the terminal device and the access network device include corresponding hardware structures and/or software modules for performing the functions. A person skilled in the art should be easily aware that units and algorithm steps in examples described with reference to the embodiments disclosed in this specification may be implemented in a form of hardware or in a form of a combination of hardware and computer software in this application. Whether a function is performed by hardware or in a manner of driving hardware by computer software depends on a particular application and a design constraint condition of a technical solution. A person skilled in the art may use different methods to implement the described functions for each particular application, but it should not be considered that the implementation goes beyond the scope of this application.

In this application, the terminal device and the like may be divided into functional units based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that the unit division in this application is an example, and is merely logical function division and may be performed in another division manner in actual implementation.

Figure 7:
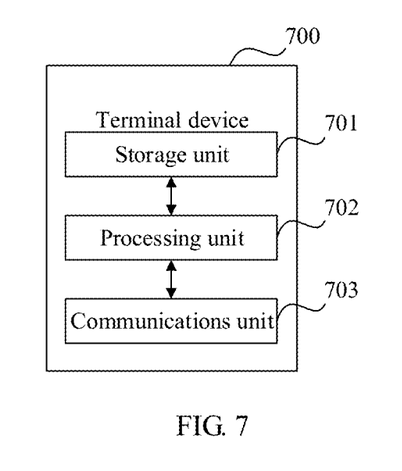
FIG. 7 is a possible schematic structural diagram of a terminal device according to this application.

When an integrated unit is used, FIG. 7 is a possible schematic structural diagram of the terminal device described in the foregoing embodiments. A terminal device 700 includes a processing unit 702 and a communications unit 703. The processing unit 702 is configured to control and manage an action of the terminal device 700. For example, the processing unit 702 is configured to support the terminal device 700 in performing S220 in FIG. 2 and/or another process of the technology described in this specification. The communications unit 703 is configured to support communication between the terminal device 700 and another network entity, for example, communication between the terminal device 700 and an access network device. The terminal device 700 may further include a storage unit 701, configured to store program code and data of the terminal device 700.

The processing unit 702 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit 702 may implement or execute various example logical blocks, modules, and circuits described with reference to content disclosed in this application. Alternatively, the processor may be a combination for implementing a computing function, for example, a combination of one or more microprocessors or a combination of a DSP and a microprocessor. The communications unit 703 may be a transceiver, a transceiver circuit, or the like. The storage unit 701 may be a memory.

After obtaining a first resource configuration parameter, the terminal device 700 determines a resource of a first LCH by determining whether a mapping relationship exists between the first LCH and the first resource configuration parameter, to map the first LCH to the resource that matches the first LCH. This improves resource utilization.

Figure 8:
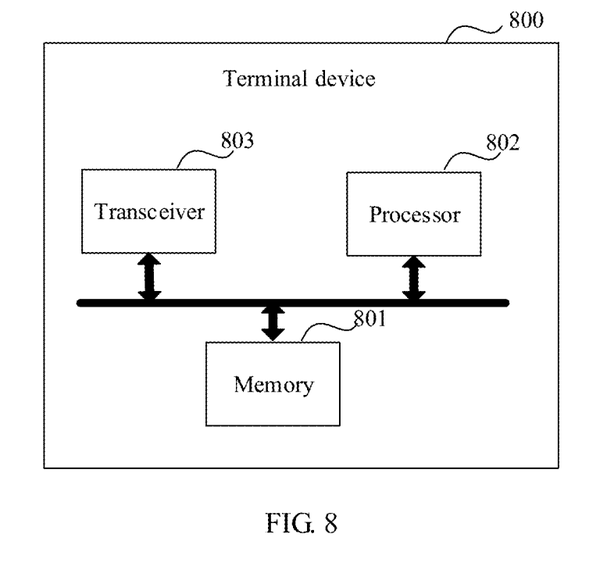
FIG. 8 is another possible schematic structural diagram of a terminal device according to this application.

When the processing unit 702 is a processor, the communications unit 703 is a transceiver, and the storage unit 701 is a memory, the terminal device in this embodiment of this application may be a terminal device shown in FIG. 8.

Referring to FIG. 8, the terminal device 800 includes a processor 802, a transceiver 803, and a memory 801. The transceiver 803, the processor 802, and the memory 801 may communicate with each other through an internal connection channel, and transmit a control signal and/or a data signal.

A person skilled in the art may clearly understand that, for brief and convenient description, for a specific working process of the foregoing described apparatuses and units, refer to a corresponding process in the foregoing method embodiments. Details are not repeated here.

After obtaining a first resource configuration parameter, the terminal device 800 determines a resource of a first LCH by determining whether a mapping relationship exists between the first LCH and the first resource configuration parameter, to map the first LCH to the resource that matches the first LCH. This improves resource utilization.

Figure 9:
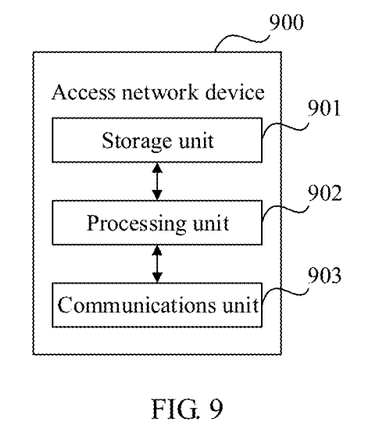
FIG. 9 is a possible schematic structural diagram of an access network device according to this application.

When an integrated unit is used, FIG. 9 is a possible schematic structural diagram of the access network device described in the foregoing embodiments. An access network device 900 includes a processing unit 902 and a communications unit 903. The processing unit 902 is configured to control and manage an action of the access network device 900. For example, the processing unit 902 is configured to support the access network device 900 in performing S610 in FIG. 6 and/or another process of the technology described in this specification. The communications unit 903 is configured to support communication between the access network device 900 and another network entity, for example, communication between the access network device 900 and a terminal device. The access network device 900 may further include a storage unit 901, configured to store program code and data of the access network device 900.

The processing unit 902 may be a processor or a controller, for example, may be a CPU, a general-purpose processor, a DSP, an ASIC, an FPGA or another programmable logic device, a transistor logic device, a hardware component, or any combination thereof. The processing unit 902 may implement or execute various example logical blocks, modules, and circuits described with reference to content disclosed in this application. Alternatively, the processor may be a combination for implementing a computing function, for example, a combination of one or more microprocessors or a combination of a DSP and a microprocessor. The communications unit 903 may be a transceiver, a transceiver circuit, or the like. The storage unit 901 may be a memory.

The access network device 900 for data transmission indicates, to a terminal device, a first resource configuration parameter used to determine a resource of an LCH, so that the LCH can match the first resource configuration parameter. This improves resource utilization. Moreover, the access network device 900 can further flexibly indicate a resource configuration parameter allocated to the terminal device. In addition, an existing information format does not need to be modified, and good compatibility is provided.

Figure 10:
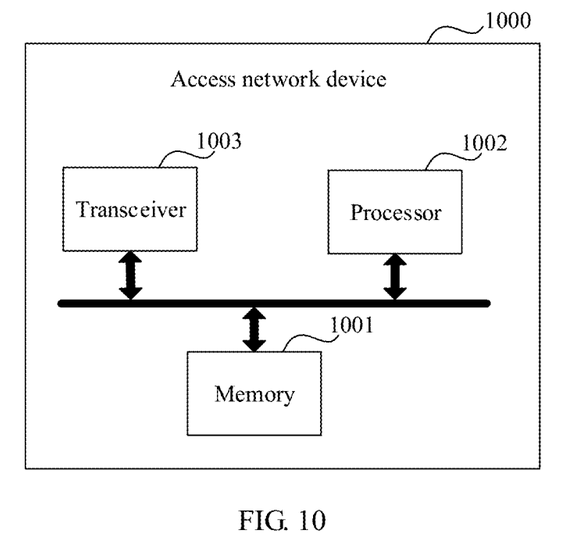
FIG. 10 is another possible schematic structural diagram of an access network device according to this application.

When the processing unit 902 is a processor, the communications unit 903 is a transceiver, and the storage unit 901 is a memory, the access network device in this embodiment of this application may be an access network device shown in FIG. 10.

Referring to FIG. 10, the access network device 1000 includes a processor 1002, a transceiver 1003, and a memory 1001. The transceiver 1003, the processor 1002, and the memory 1001 may communicate with each other through an internal connection channel, and transmit a control signal and/or a data signal.

A person skilled in the art may clearly understand that, for brief and convenient description, for a specific working process of the foregoing described apparatuses and units, refer to a corresponding process in the foregoing method embodiments. Details are not repeated here.

The access network device 1000 for data transmission indicates, to a terminal device, a first resource configuration parameter used to determine a resource of an LCH, so that the LCH can match the first resource configuration parameter. This improves resource utilization. Moreover, the access network device 1000 can further flexibly indicate a resource configuration parameter allocated to the terminal device. In addition, an existing information format does not need to be modified, and good compatibility is provided.

It should be understood that sequence numbers of the foregoing processes do not necessarily mean execution sequences in various embodiments of this application. The execution sequences of the processes should be determined based on functions and internal logic of the processes, and should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The methods or algorithm steps described with reference to the content disclosed in this application may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read only memory (erasable programmable ROM, EPROM), an electrically erasable programmable read only memory (electrically EPROM, EEPROM), a register, a hard disk, a mobile hard disk, a compact disc read-only memory (CD-ROM), or any other form of storage medium well-known in the art. A storage medium used as an example is coupled to the processor, so that the processor can read information from the storage medium, and can write information into the storage medium. Certainly, the storage medium may be a component of the processor. The processor and the storage medium may be located in an ASIC. In addition, the ASIC may be located in the terminal device. Certainly, the processor and the storage medium may alternatively exist in the terminal device and the access network device as discrete components.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, all or some of the procedures or functions in this application are generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Objectives, technical solutions, and beneficial effects of this application are described in detail in the foregoing exemplary implementations. It should be understood that the foregoing descriptions are merely exemplary implementations of this application, but are not intended to limit the protection scope of this application. Any modification or improvement made based on technical solutions of this application may fall within the protection scope of this application.

What is claimed is:

1. A method, wherein the method comprises:
sending, by a terminal device, a scheduling request and a buffer status report to an access network device, and reporting a resource configuration parameter requirement to the access network device;
obtaining, by the terminal device, a first resource configuration parameter and a second resource configuration parameter from the access network device, wherein the first resource configuration parameter corresponds to a first medium access control protocol data unit (MAC PDU) and the second resource configuration parameter corresponds to a second MAC PDU;
aggregating, by the terminal device, data on a first plurality of logical channels (LCHs) to constitute the first MAC PDU and sending the first MAC PDU to the access network device; and
aggregating, by the terminal device, data on a second plurality of LCHs to constitute the second MAC PDU and sending the second MAC PDU to the access network device.

2. The method according to claim 1, wherein obtaining the first resource configuration parameter from the access network device comprises:
receiving, by the terminal device, an uplink grant from the access network device, wherein the uplink grant comprises the first resource configuration parameter or indication information of the first resource configuration parameter; and
determining, by the terminal device, the first resource configuration parameter based on the uplink grant.

3. The method according to claim 1, wherein the first resource configuration parameter comprises a subcarrier spacing, a transmission time interval (TTI), and/or a cyclic prefix (CP).

4. A method, wherein the method comprises:
receiving, by an access network device, a scheduling request, a buffer status report, and a resource configuration parameter requirement from a terminal device;
allocating, by the access network device, a first resource configuration parameter and a second resource configuration parameter to the terminal device, wherein the first resource configuration parameter corresponds to a first medium access control protocol data unit (MAC PDU) and the second resource configuration parameter corresponds to a second MAC PDU;
indicating, by the access network device, the first and second resource configuration parameters to the terminal device; and
receiving, by the access network device, the first MAC PDU and the second MAC PDU from the terminal device, wherein the first MAC PDU corresponds to aggregated data on a first plurality of logical channels (LCHs) and the second MAC PDU corresponds to aggregated data on a second plurality of LCHs.

5. The method according to claim 4, wherein the first and second resource configuration parameters are indicated to the terminal device via first and second uplink grants, respectively.

6. An apparatus, wherein the apparatus comprises:
a transceiver;
a processor; and
a non-transitory computer-readable storage medium having processor-executable instructions stored thereon, wherein the processor-executable instructions, when executed by the processor, facilitate:
sending, via the transceiver, a scheduling request and a buffer status report to an access network device, and reporting a resource configuration parameter requirement to the access network device;
obtaining, via the transceiver, a first resource configuration parameter and a second resource configuration parameter from the access network device, wherein the first resource configuration parameter corresponds to a first medium access control protocol data unit (MAC PDU) and the second resource configuration parameter corresponds to a second MAC PDU;
aggregating data on a first plurality of logical channels (LCHs) to constitute the first MAC PDU and sending, via the transceiver, the first MAC PDU to the access network device; and
aggregating data on a second plurality of LCHs to constitute the second MAC PDU and sending, via the transceiver, the second MAC PDU to the access network device.

7. The apparatus according to claim 6, wherein the processor-executable instructions, when executed by the processor, further facilitate:
receiving an uplink grant from the access network device, wherein the uplink grant comprises the first resource configuration parameter or indication information of the first resource configuration parameter; and
determining the first resource configuration parameter based on the uplink grant.

8. The apparatus according to claim 6, wherein the first resource configuration parameter comprises a subcarrier spacing, a transmission time interval (TTI), and/or a cyclic prefix (CP).

9. An apparatus, wherein the apparatus comprises:
a transceiver;
a processor; and
a non-transitory computer-readable storage medium having processor-executable instructions stored thereon, wherein the processor-executable instructions, when executed by the processor, facilitate:
receiving, via the transceiver, a scheduling request, a buffer status report, and a resource configuration parameter requirement from a terminal device;
allocating a first resource configuration parameter and a second resource configuration parameter to the terminal device, wherein the first resource configuration parameter corresponds to a first medium access control protocol data unit (MAC PDU) and the second resource configuration parameter corresponds to a second MAC PDU;
indicating, via the transceiver, the first and second resource configuration parameters to the terminal device; and
receiving, via the transceiver, the first MAC PDU and the second MAC PDU from the terminal device, wherein the first MAC PDU corresponds to aggregated data on a first plurality of logical channels (LCHs) and the second MAC PDU corresponds to aggregated data on a second plurality of LCHs.

10. The apparatus according to claim 9, wherein the first and second resource configuration parameters are indicated to the terminal device via first and second uplink grants, respectively.

11. The method according to claim 1, wherein the first resource configuration parameter and the second resource configuration parameter are obtained via an uplink grant.

12. The method according to claim 1, wherein the first MAC PDU and the second MAC PDU are sent simultaneously.

13. The method according to claim 1, wherein the first MAC PDU and the second MAC PDU are not sent simultaneously.

14. The method according to claim 4, wherein the first MAC PDU and the second MAC PDU are received simultaneously.

15. The method according to claim 4, wherein the first MAC PDU and the second MAC PDU are not received simultaneously.

16. The apparatus according to claim 6, wherein the first resource configuration parameter and the second resource configuration parameter are obtained via an uplink grant.

17. The apparatus according to claim 6, wherein the first MAC PDU and the second MAC PDU are sent simultaneously.

18. The apparatus according to claim 6, wherein the first MAC PDU and the second MAC PDU are not sent simultaneously.

19. The apparatus according to claim 9, wherein the first MAC PDU and the second MAC PDU are received simultaneously.

20. The apparatus according to claim 9, wherein the first MAC PDU and the second MAC PDU are not received simultaneously.

* * * * *